Patented May 5, 1925.

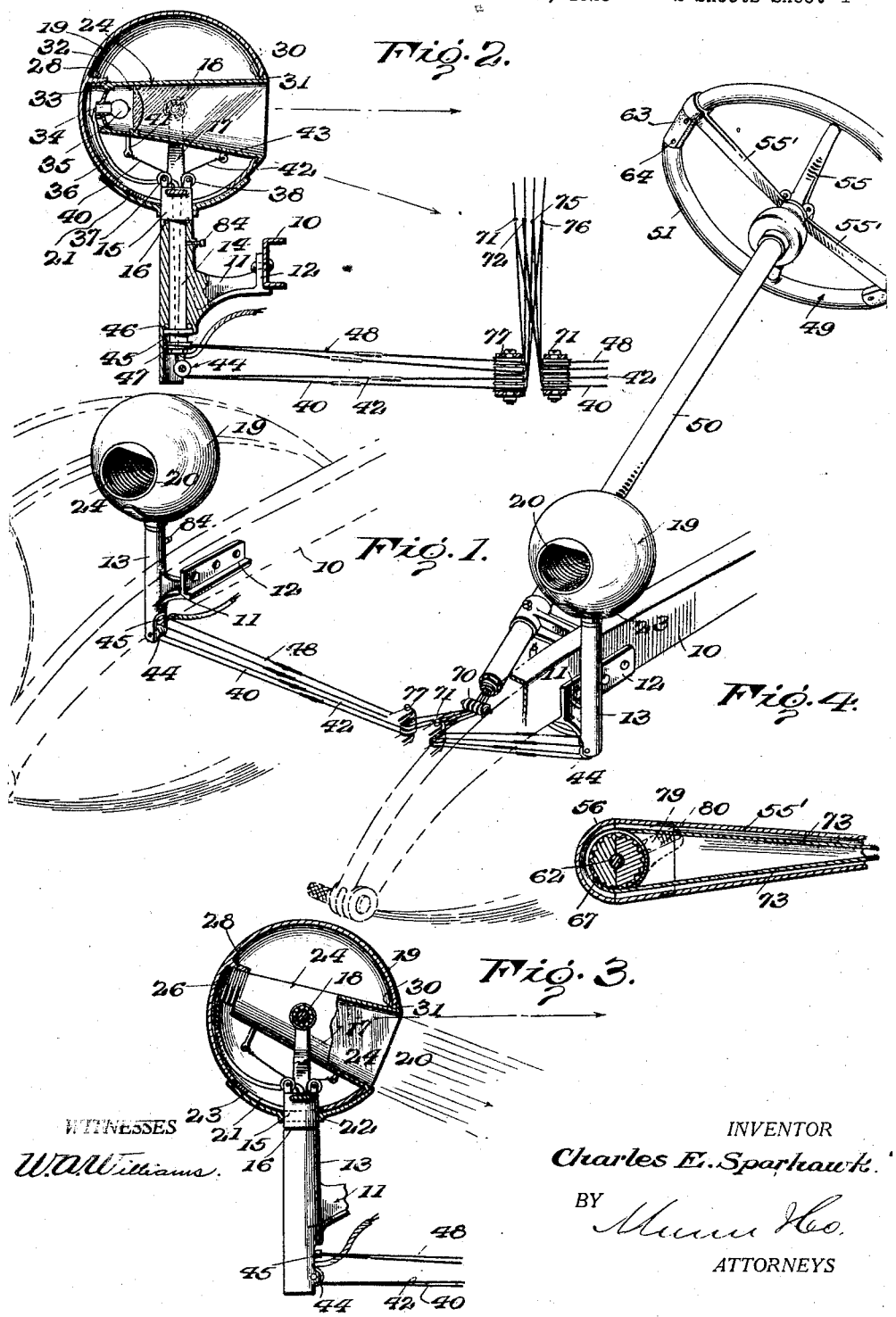

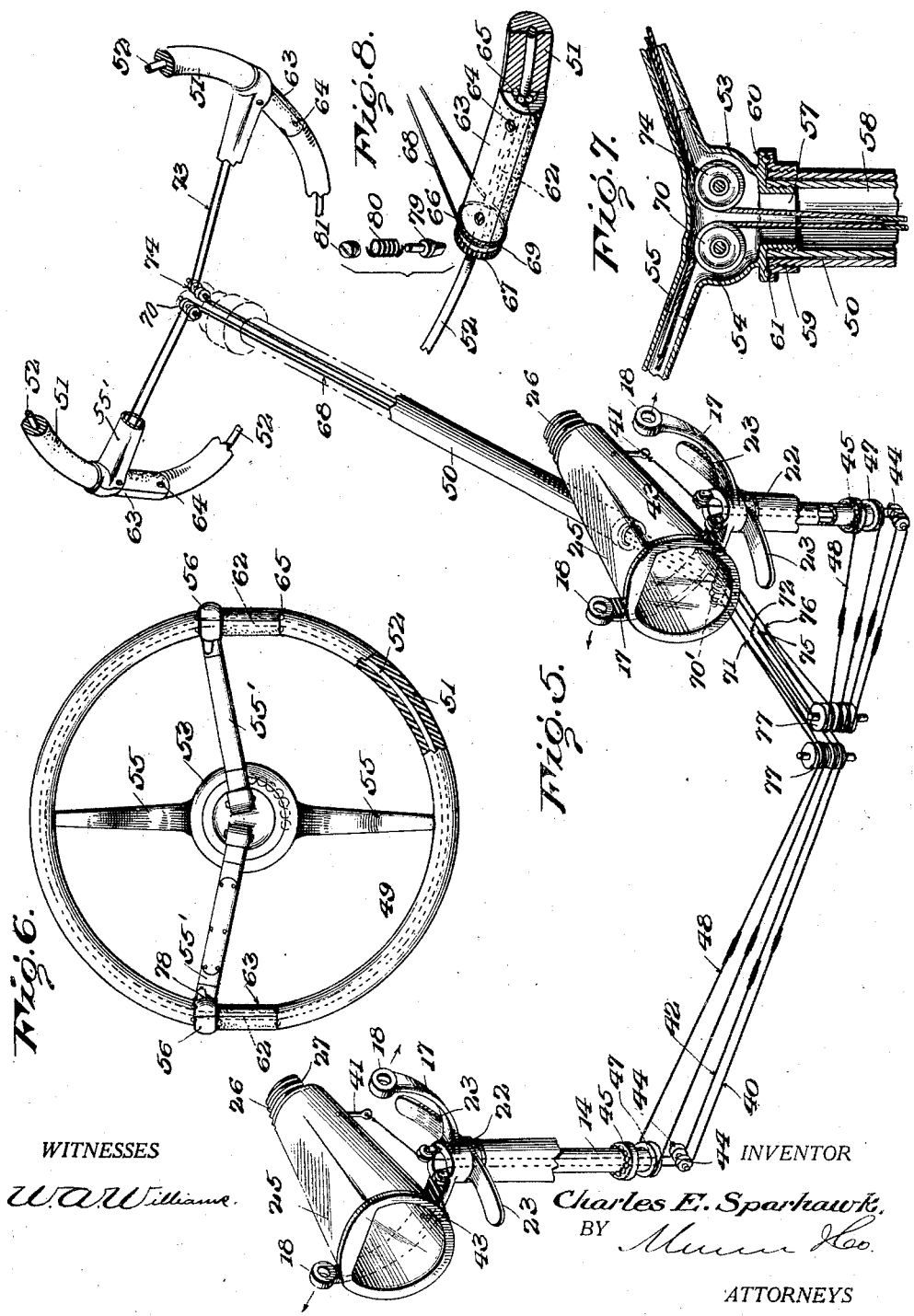

1,536,158

UNITED STATES PATENT OFFICE.

CHARLES E. SPARHAWK, OF DRUMBELLER, ALBERTA, CANADA, ASSIGNOR TO HIMSELF, CHARLES W. PERRY, AND HILLIARD C. McCONKEY, TRUSTEES, ALL OF DRUMBELLER, CANADA.

DIRIGIBLE HEADLIGHT.

Application filed March 28, 1923. Serial No. 628,369.

*To all whom it may concern:*

Be it known that I, CHARLES E. SPARHAWK, a subject of the King of England, residing at Drumbeller, Province of Alberta, Dominion of Canada, have invented certain new and useful Improvements in Dirigible Headlights, of which the following is a specification.

This invention relates to dirigible headlights for motor vehicles, or the like.

The object of the invention is to provide a headlight structure of the above character which is freely revoluble about a vertical axis and freely tiltable about its transverse axis and associate controlling means therewith whereby the same may be operated from the steering wheel of the motor vehicle to which the same may be applied.

It is an important object of the invention that the controlling means for the headlights will operate so that the turning of the headlights about a vertical axis may take place simultaneously with the operator turning the steering wheel of the motor vehicle; that is, to provide means whereby with the motion movement of the operator's hands in turning a steering wheel, the operator may also effect a movement of the headlights similar to the steering wheel and thereby at all times illuminate the roadway immediately forward to the motor vehicle.

A further and important object of the invention is to provide means whereby the headlights upon a motor vehicle may be simultaneously tilted upon their transverse axis from the steering wheel of the motor vehicle.

A still further object of the invention is that the headlights may be operated or moved in an easy and quick manner so that they may be brought to direct the shaft of light in any desired direction and thus may be employed when repairing the associated motor vehicle at night or may be employed for disclosing the roadway at the rear of the motor vehicle in case the driver desires to back the motor vehicle for turning or other similar purposes.

A still further object of the invention is that the headlights employed be of such structure and arrangement that they will in no way blind the driver of an oncoming motor vehicle or other persons facing the automobile on which the lights may be carried.

Other objects, and objects relating to details of construction, combination and arrangement of parts will hereinafter appear in the detailed description to follow.

The invention is illustrated by way of example in the accompanying drawings, in which:

Figure 1 is a schematic view illustrating the application of a pair of dirigible headlights of the present invention to a motor vehicle, Figure 2 is a vertical sectional view taken through one of the headlights and showing the associated operating means therefor.

Figure 3 is a view similar to Figure 2 but showing the headlight when tilted upon its transverse axis, Figure 4 is a detail sectional view illustrating a pawl and ratchet arrangement, whereby to retain the lamps in their adjusted position.

Figure 5 is a view similar to Figure 1 with certain parts omitted and further illustrating the particular construction and arrangement of the headlights and operating means therefor, Figure 6 is a plan view of a steering wheel to which the present invention has been applied, Figure 7 is a detailed sectional view of the hub of a steering wheel with which the present invention has been incorporated, and Figure 8 is a fragmentary perspective view showing the lamp operating means embraced in the steering wheel adjacent to one of the hand grips.

Like reference numerals refer to similar parts throughout the several views of the drawings.

Referring to the drawings more particularly, as best shown in Figure 1, in applying the invention to a motor vehicle each side frame member 10 of the motor vehicle may have secured thereto and upon its outer side a bracket arm 11, said bracket arm in each instance being preferably formed integrally with an angular portion 12 which is adapted to be bolted to the associated frame member 10, as illustrated; and also each bracket arm 11 terminates at its outer end in an upright tubular member 13 within which there is turnably fitted a spindle 14, said spindle having formed at its upper end an enlargement 15 which is substantially equal in diameter to the tubular member 13. Between the opposing ends of the enlargement 15 and tubular member 13 there is interposed ball bearings 16, whereby to permit easy turning movement of the spindle 14. The enlargement 15 of the spindle 14 is formed with a pair of supporting arms 17 which are preferably arcuate in shape and each supporting arm terminating at its free end in a journal collar 18. The arms 17 are preferably arranged diametrically opposite each other and pivotally support at their outer ends a casing, generally indicated by the reference numeral 19, said casing being preferably spherical as shown. Each casing 19 is provided with a front opening 20 and also with a lower elongated slot 21 through which the spindle enlargement extends. Each casing has formed upon its inner surface a pair of diametrically disposed studs, one for each of the supporting arms 17, and these studs are employed in connection with the collars 18 of the supporting arms 17 for supporting each casing 19, so that the same is freely tiltable or rockable upon its transverse axis. Each collar 18 may be provided with suitable ball bearings, as shown in Figure 3 in order to insure that the casing may be easily tilted or rocked. The slot 21 of each casing is provided to permit this rocking movement; that is, permit this movement of the casing 19 with relation to the enlargement 15 of the spindle 14. Upon the enlargement 15 of each spindle 14 there is secured a collar 22 which has extending therefrom a pair of diametrically disposed tangs 23, said tangs being arcuate in shape and adapted to form a closure for the slot 21, and in this way avoid dirt entering the casing 19. Within each casing 19 there is mounted an auxiliary casing, generally indicated by the numeral 24, which is in the form of a truncated cone with the exception that it is provided with a flattened inner surface 25. The one end of this reflector is threaded, as at 26, and this threaded portion is provided with a recess 27 to receive electric wires as presently described. Each casing 19 is formed with an interiorly threaded nipple 28, and which is adapted to receive the threaded end 26 of the auxiliary casing or barrel 24. Also this nipple is provided with a slot, as illustrated in Figure 3, and which may be brought into register with the recess 27 of the associated casing 24 in order that wires may be extended into said casing. Each casing 19 may also be formed about its opening 20 with an inwardly extending lip 30 which is adapted to receive a lip 31 formed upon the forward or outer end of each barrel or casing 24 which may be brazed or otherwise connected whereby to permit said casing to be positively held within the associated casing 19. Within each casing 24 there is mounted a lens 32 and at the rear of this lens there is provided a suitable supporting member 33 extending transversely of the casing 24 which may in turn support a socket 34 for carrying an electric lamp 35.

It is important to here note that the interior of each casing 24 is coated or painted with a paint or the like giving a dull finish and preferably black in color. The purpose of this is to avoid the possibility of the lamp 35 in the casing 24 blinding persons facing the same, that is, with the interior of the casing 24 coated with a black substance the same will not act as a reflector. In this way the rays of light emanating from the lamp 35 will be directed forwardly and from the casing 24 in a clearly defined shaft and a person looking at this light from a distance would not be blinded by any reflector as is usual with head lamps of this character.

The lamp 35 of each headlight may have connected to one of its terminals a suitable wire 36, and its other terminal ground. The wire 36 may be extended downwardly through the spindle 14, said spindle being hollow and then the wire may be extended to a suitable source of electric current supply, whereby to energize the associated lamp 35. Also a suitable switch may be inserted in the circuit in order to illuminate the lights when desired.

Upon the upper end of each enlargement 15 of the spindle 14 there is rotatably supported a pair of pulleys 37—38, said pulleys being preferably formed with a V-shaped groove and over the pulley 37 there is passed a cable 40 which has its upper end secured to the free end of a finger 41 depending from the rear end of the casing 24. A second cable 42 is passed over the pulley 38, and has its upper end secured to an ear 43 formed upon the lower side of casing 24 adjacent its forward end and the cables 40 and 42 are extended downwardly through the hollow spindle 14 and each passed over a grooved pulley 44 supported by the lower end of the tubular member 13.

Each hollow spindle 14 carries a collar 45 adjacent its lower end. This collar preferably has associated therewith ball bearings 46 to further facilitate the turning movement of the spindle 14. Also the lower end of each spindle 14 carries a grooved pulley 47 which is suitably secured thereto and over which there passes a cable 48. As is obvious the cable 48 may be employed for rotating the spindle 14, while the cables 40 and 42 may be employed for rocking the casing 19 upon its transverse axis in either direction.

Referring to Figures 1 to 5, 49 indicates generally a steering wheel and 50 the usual steering column. In the present instance this steering wheel 45 preferably is formed of a ring 51 of the usual diameter and of any suitable material. This ring is, of course, circular in cross section and is reinforced by a wire 52, said wire being positioned as shown. The steering wheel also includes the usual hub casing 53 which is shown to advantage in Figure 7 and as seen comprises a central hollow portion 54 which is formed with two spokes 55 which are preferably solid, said spokes being secured to the ring 51 in any desirable manner. Also the hub is formed with a pair of hollow spokes 55′, the passage therein communicating with the interior of the hub portion 54. Each spoke 55′ terminates at its outer end in a split collar 56 which is clamped to the ring 51 in any suitable manner. The hub 53 of the steering wheel is also formed with an exteriorly threaded nipple 57 which is adapted to be screwed into the upper end of the steering post 58 of the associated motor vehicle. The steering column 50 is preferably provided with a flanged collar 59 which is disposed immediately beneath a flange 60 formed upon the hub 53 of the steering wheel and between the flange 60 and the collar 59 there is interposed ball bearings 61 for an apparent purpose.

Adjacent the one side of each collar 56 the steering wheel has a portion thereof cut away and the portion 62 of the rod 52 exposed in each instance is straight, and upon each rod portion 62 there is turnably mounted a split sleeve or grip 63. This grip may be made of any desirable material and preferably of such material as will expand sufficiently to permit the same to be easily positioned upon the rod portion 62. Suitable screws or the like, as at 64, may be employed for securing the split sections of the sleeves together, and interposed between each sleeve or grip 63 and its associated rod portion 62 are the ball bearings 65, and thereby to permit easy rotative movement to these grips.

The collars 56 are adapted to permit the associated end of the grips or sleeves 63 to freely revolve therein. Upon the end of each grip or sleeve 63 disposed within the associated collar 56 there is a grooved pulley 66, and upon one side of this pulley there is secured in each instance a ratchet wheel 67. The pulley and ratchet wheel may be cast integrally if so desired. The pulley 66 and associated ratchet wheel 67 is in direct alignment with the passage of the associated spoke 55′.

Over one of the grooved pulleys 66 there is trained a cable 68, said cable being preferably passed twice about the pulley and positively secured to said pulley, as at 69. This cable is further extended over a pair of grooved sheaves 70 which are rotatably supported within the hub 53 of the steering wheel. The cable is also extended downwardly through the steering post 58 and the lower ends thereof extend beneath suitable guide sheaves 70′ which are supported in any conventional manner at the place shown in Figure 5 and one end of this cable is suitably connected, as at 71, to the free end of each of the cables 48, that is, to one end of each cable 48 employed for rotating the spindle 14 together with the headlight carried thereby, and the other end of the cable 68 is connected, as at 72, to the remaining end of each of the cables 48.

About the grooved pulley 66 of the remaining grip 63 there is trained a cable 73, said cable being passed about the grooved pulley 66 twice and then secured to said pulley the same as with the cable 68. The cable 73 is further trained over guide pulleys 74 carried by the hub 53 of the steering wheel and then extended downwardly through the steering post 58 and the lower ends passed or trained beneath some of the guide pulleys 70′, the same as cable 68. The one end of the cable 73 is secured, as at 75, to the free end of each of the cables 40, while the other end of cable 73 is secured to the free end of each of the cables 42, as at 76. Also suitable guide pulleys 77 may be provided for the different cables 48, 40 and 42, and these may be supported by suitable spindles or shafts, as shown, which in turn may be supported by brackets (not shown) carried by the motor vehicle.

Upon each collar 56 of each hollow spoke 55′ of the steering wheel there is formed a nipple 78 which slidably receives a pawl or plunger 79, said plunger being formed with a pointed head, as best shown in Figure 8, which is adapted to engage with the ratchet wheel 67. The plunger is pressed inwardly by means of a coil or compression spring 80 and this compression spring is suitably held in place by a screw plug 81. The purpose of this latch or pawl arrangement 79 is to yieldably hold the grip 63 against turning movement.

In the use of the present apparatus, assuming that the headlights are arranged and positioned upon a motor vehicle, as shown in Figure 1 of the drawings and that the different operating means therefor are suitably connected as heretofore described and that the motor vehicle with which the headlights are associated is proceeding forwardly, the casing 24 at this period may be disposed to direct the shaft of light emanating therefrom directly forward to the motor vehicle and in this way properly illuminate the roadway. In connection with these headlights it should be here pointed out that the auxiliary casings 24 operate to clearly define the shaft of light emanating therefrom and that this light when thrown forwardly will not blind drivers of oncoming motor vehicles. The driver of the oncoming motor vehicle would simply see the shaft of light and would not be blinded by the lamps, as is usually the case with headlights of the present construction.

Assuming that the driver desires to turn his motor vehicle to the left then he would accordingly manipulate the steering wheel and with his right hand upon one of the grips 63, that is, the grip which would be the one upon which his right hand would naturally rest, he may readily move or turn such grip slightly when turning the steering wheel and this turning movement of the grip about its rod portion 62 and rotation of the grip will in turn operate the cable 68 which in turn will draw upon similar ends of the cables 48 and thus swing or rotate the casing 19 in a direction corresponding to the movement of the steering wheel of the motor vehicle whereby the operator may thus simultaneously shift the headlights with the turning of the motor vehicle so that the space immediately before the motor vehicle will at all times be illuminated. Upon the driver turning to the right his right hand may move the sleeve or grip 63 grasped thereby in an opposite direction, and in this way again bring the rays to illuminate the roadway immediately before the motor vehicle.

As is obvious the left hand of the driver of the motor vehicle can grip the remaining grip or sleeve 63 and when he desires to tilt the headlights he should revolve or turn the sleeve to secure the desired tilting of the headlights. Upon turning this sleeve in either direction, the same will operate the cable 73 and this cable will in turn draw upon a similar end of each of the cables 40 or upon the similar end of each of the cables 42 and thereby permit the headlight to be tilted or rocked in either direction. Upon rocking either of the headlights the same may be tilted, as illustrated in Figure 3, and in this way direct the shaft of light emanating therefrom closely and immediately forward of the motor vehicle. Should it become necessary to use the headlights when backing the motor vehicle then the proper sleeve or grip 63 may be rotated to affect this positioning of the headlights, that is, to bring the same so that the shafts of light therefrom will be directed rearwardly with respect to the motor vehicle. Also the lamps may be brought to a position so that they can be employed for repairing the motor vehicle at night. Furthermore, it is important to note that the latch element 79 in each instance will operate to hold the sleeves 63 in their adjusted position. The latch elements 79 should be so tensioned that no great effort is necessary to rotate either of the grips 63.

Also it is important to note that each of the tubular supporting members 13 might be provided with a set screw, as at 84, and thereby enable a person to lock the spindles 14 against rotative movement. These set screws would, of course, only be employed in case that the operating means for revolving and rocking the headlights should become inoperative and if it is desired to set the headlights in one position until the operating means therefor can be repaired.

While I have shown and described the preferred form of my invention, I wish it to be understood, that I am aware of the fact that the construction, combination and arrangement of parts may be changed by those skilled in the art without departing from the spirit of the invention, as indicated by the appended claims.

I claim:

1. In an apparatus of the character described, a steering wheel having rotatable hand grips, a pair of headlights, each including a globular casing provided with a front opening and with a lower elongated slot, a tapering barrel fixed diametrically within the casing and having its larger end interfitting the front opening of the casing, a light bulb and lens within said barrel adjacent to its inner smaller end, an upright hollow spindle having its upper end projecting into the casing through said slot and provided with upwardly and outwardly curved arms pivotally connected to the inner surface of the casing at diametrically opposed points in a line at right angles to the axis of the barrel, means carried by the upper portion of the spindle to cover the casing slot, a support in which the spindle is journaled, and flexible control members actuated by the steering wheel and by the said hand grips, the former operatively associated with the lower end of the spindle and the latter extending upwardly through the spindle and connected to the forward and rear portions of the barrel within the casing.

2. In an apparatus of the character described, a steering wheel, rotatable hand grips thereon, flexible control members leading from said wheel and hand grips, a pair of headlights, each having a globular casing provided with a front opening and with a threaded socket therein diametrically opposed to said opening, a tapering barrel threaded at its smaller end to screw into said socket and formed at its larger end to interfit the casing opening, a light bulb and lens in said barrel, said casing having a lower slot, a spindle having its upper end projecting into the casing and provided with upwardly and outwardly curved supporting arms pivotally connected to the inner surface of the casing at diametrically opposite sides of the latter, said spindle being hollow and operatively connected at its lower end to the flexible control members of the steering wheel, and also having spaced from its upper end upwardly and outwardly curved tangs overlying the casing slot, and the flexible control members of the hand grips extending upwardly through the hollow spindle and the barrel at spaced points in the length of the latter.

CHARLES E. SPARHAWK.